May 9, 1967   J. B. TOOMEY, JR., ET AL   3,319,058
PHOTOGRAPHIC FLASH LAMP UNIT
Filed Aug. 17, 1966

INVENTORS
JOHN B. TOOMEY, JR.
WILLIAM F. FRIZZELL

BY Edmund M. Jaskiewicz
ATTORNEY

3,319,058
PHOTOGRAPHIC FLASH LAMP UNIT
John B. Toomey, Jr., and William F. Frizzell, both of Alexandria, Va., assignors to Value Engineering Company, Alexandria, Va., a corporation of Virginia
Filed Aug. 17, 1966, Ser. No. 573,070
9 Claims. (Cl. 240—1.3)

The present application is a continuation-in-part of U.S. patent application having the Ser. No. 437,215 and filed Mar. 4, 1965, by the same named inventors.

The present invention relates to a photo flash bulb adapted to be ignited electrically, more particularly, to such a flash bulb having a self-contained battery in the base thereof which battery is capable of providing sufficient voltage to cause ignition of the flash bulb.

The conventional photo flash bulb comprises a glass envelope having a base which is inserted into a corresponding socket on a flash attachment for a camera. Within the envelope is an ignitable substance which radiates actinic light when burned. This substance is ignited by an igniting mechanism usually comprising one or more filaments which are connected by current supply wires to two contacts provided on the base of the flash bulb. Electric current to actuate the igniting mechanism is provided by an external source of electrical energy such as an electric cell which when connected in circuit with the contacts on the base of the flash bulb by a switch in synchronization with the shutter of the camera the ignitable substance will be ignited.

Such electric cells are usually mounted in the flash attachment and are used a number of times. However, it is difficult for the photographer to ascertain when the electric cell becomes exhausted since when the cell is tested there is an indication of current, but this current may not be sufficient to ignite the flash bulb. Thus not only is it necessary to provide an external source of electrical energy to ignite the conventional flash bulb but this source of energy must be frequently checked to insure that sufficient electric current will be generated to ignite the flash bulb. When the flash attachment including the electric cell is not used for a long period of time the cell will not generate sufficient electricity and the result would be a badly underexposed photograph.

It is therefore the principal object of the present invention to provide a novel and improved photo flash bulb.

It is another object of the present invention to provide a flash bulb having a self contained electric battery therein.

It is a further object of the present invention to provide a photo flash bulb which eliminates the necessity of providing an external source of electrical energy to ignite the flash bulb.

It is another object of the present invention to provide a photo flash lamp unit having a self contained source of electrical energy therein for igniting selectively a plurality of sources of actinic light positioned within the envelope of the unit.

The present invention essentially comprises a photo flash bulb having a self contained battery mounted therein and connected between the mechanism for igniting the ignitable substance within the envelope of the bulb and contacts on the base of the bulb. With this arrangement, the flash bulb can be ignited merely by short circuiting the contacts on the base thereof.

The battery is composed of battery paste and may be enclosed in a plastic coating. The battery may also be embedded in the base portion of the envelope of the bulb. The battery is of sufficient size to generate voltage to ignite once the flash bulb. Where a flash unit consists of a number of flash bulbs, the battery has a capacity sufficient to ignite once each flash bulb in the unit.

Other objects and advantages of the present invention will be apparent upon reference to the accompanying specification when taken in conjunction with the following drawings wherein.

The flash bulb of this inventiton can be used in present flash attachments which have the conventional provision for a battery as the source of electrical energy. In such flash attachments the battery is removed since it is not necessary and a bar of an electrically conducting material such as copper or aluminum is inserted in the battery space so that an electrical circuit is formed.

Figure 1:
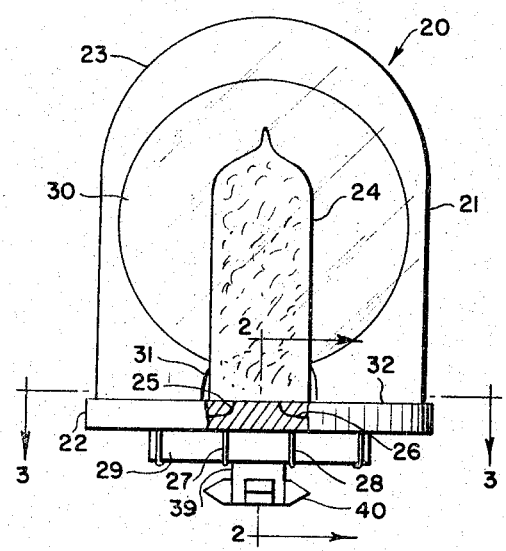
FIGURE 1 is an elevational view of a modification of the present invention wherein multiple flash bulbs are ignited by battery within the envelope of the unit.

With particular reference to FIGURE 1 there is shown a modification of the present invention wherein a plurality of flash lamps are mounted in a unit with a source of electrical energy being also mounted in the unit so that no outside source of electrical energy is necessary in order to ignite the flash bulb. As may be seen in FIGURE 1 this photo flash unit is indicated generally at 20 and comprises a cylindrical envelope 21 of light transmitting material with one end being closed by a base 22 and the other end being rounded to form a dome shaped top 23. The envelope 21 may be glass or of a suitable plastic material such as, for example, cellulose acetate.

Mounted upon base 22 within the envelope 21 are a plurality of photo flash lamps 24 which may comprise an hermetically sealed tubular envelope of conventional structure. The essential structure of each flash lamp 24 is similar to that of the flash bulb described in applicants' copending application S.N. 437,215. Each flash lamp has a pair of leads 25 and 26 extending therefrom for connection with corresponding contacts 27 and 28 located on the rim of a disc like member 29 attached to the lower or outer face of base 22.

Behind each flash lamp 24 is mounted a reflector 30 which may have an opening 31 in its lower portion to receive the lamp 24. The reflectors 30 may be made of any suitable material including plastic such as cellulose acetate, polystyrene or polycarbonate, for example and are provided with a coating or film of light reflecting material. The lower edge 32 of each reflector rests upon the base 22 and the upper edge is curved to conform to the curved top 23 of the transparent envelope.

Positioned within the envelope 21 mounted upon the upper face of base 22 is a battery 33 which is similar to the battery described in applicants' copending application S.N. 437,215. The electrical capacity of battery 33 is somewhat greater in order to provide efficient electrical energy to ignite each of the flash lamps mounted in the unit.

The battery 33 comprises an electrochemical source electrical energy which may comprise a thin zinc strip h a coating of paper to serve as the cathode and a bon strip as the anode and an electrolyte in the form a battery paste between the two electrodes. This ctrolyte is an aqueous solution of ammonium chloride h water and saturated in granulated carbon and wdered manganese dioxide. The entire cell is then ated with a plastic such as Teflon. This unit with the mposition as described above produced a discharge ltage of 1.47 volts D.C. This voltage is more than equate to ignite the flash bulb since tests on flash bulbs different makes showed the minimum voltage required r igniting of the flash bulb to be 0.815 volt. These sh bulbs would draw between 7–35 milliamps on igion and this magnitude of current is readily provided the cell as described above. Other forms of the battery may comprise a cathode of amalgamated zinc and ode of depolarized copper and an electrolyte comising a solution of caustic potash. The terminal voltage this cell was 0.70 volt. A further form of cell included cathode of cadmium amalgam, an anode of mercury d an electrolyte composed of a paste of cadmium sulate. The terminal voltage of this cell was 1.01 volts C. The voltages of the cells were all at room temperare or 20 degrees C. It is pointed out that all of the lls described above are of the same dimension but nerate different voltages.

Figure 7:
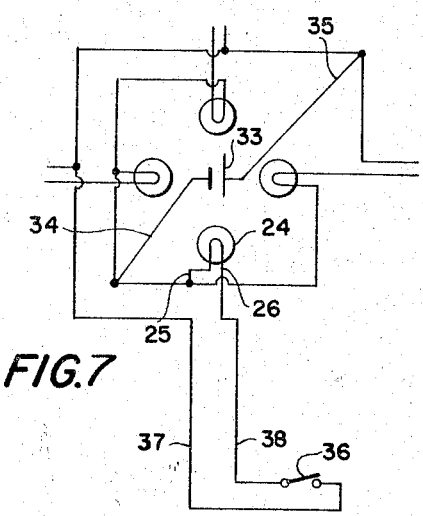
FIGURE 7 is a schematic wiring diagram showing the electric circuit connecting the self contained battery and the several flash lamps of the modifications of FIGURES 1–6.

The battery 33 has leads 34 and 35 extending thereom which are connected to the several flash lamp leads an electrical circuit as shown in FIGURE 7. As will apparent from the circuit of FIGURE 7 one of the ads 26 from each flash lamp goes directly to the conct 28 while the other lead is connected to one side the battery 33. The other contact 27 is connected the other side of the battery 33 so that closing a rcuit across the contacts 27 and 28 will connect the spective flash lamp across the battery and bring about ; ignition. Closing the circuit may be accomplished by osing an operating switch indicated at 36 and located the camera in a manner similar to that described love.

It is preferable that the camera upon which this photo ish lamp unit is to be used should be modified slightly. he surface of the camera on which this unit is to be ied may be provided with a pair of electrical contacts 7 and 38 as shown in FIGURE 7 which are connected :ross switch 36 actuated by the shutter switch of the :mera. In addition the camera may be provided with spindle which protrudes into an aperture formed in boss 39 extending downwardly from the base 22 of ie unit. If it should be desired to move automatically the ish unit to its new position after one flash lamp has 2en ignited a mechanism may be provided for this purse which is engageable with teeth 40 extending radially om the boss 39.

Other structures may be employed for rotating the ash unit to its new position. For example, this stepise rotation may be accomplished by hand after each nition of the flash lamp.

Figure 4:
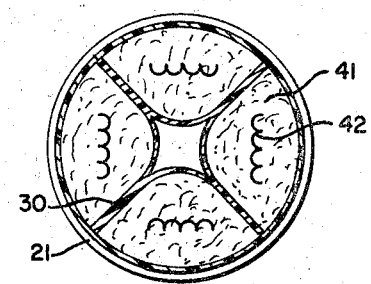
FIGURE 4 is a top plan view of the unit of FIGURE 1 but modified in that a plurality of compartments are formed in the envelope and each compartment constitutes a flash lamp.
Figure 5:
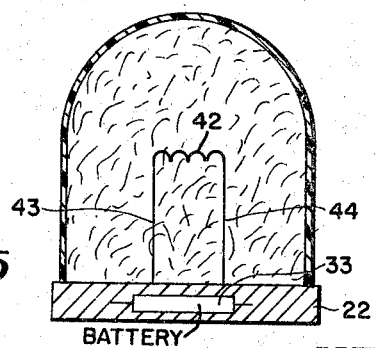
FIGURE 5 is a vertical sectional view of the unit of FIGURE 4.

In the modification of FIGURES 4 and 5 individual ash lamps are not employed but the entire envelope 21 divided into a plurality of compartments by means f the reflectors 30. Each compartment is then provided ith a metallic mass of combustible actinic light proucing material in the form of fine wires, shredded foil r leaf foil indicated at 41 and is ignited by a filament 2 connected between leads 43 and 44. This material lay be aluminum, magnesium or a suitable alloy of aluinum and magnesium. Thus in effect each compartment onstitutes an individual flash lamp. Other forms of igiting mechanism may be used and these include the omison of a filament with a primer on the ends of the wires 8 nd 9. The primer is of a composition known in the rt and such primers generally comprise a porous mixture of a readily ignitable metallic powder such as zirconium or a mixture of zirconium with magnesium and an oxidizing agent such as potassium perchlorate bonded together by a suitable binder such as nitrocellulose.

Further, in this modification the battery 33 may be embedded in the base 22 and connected electrically to each flash lamp unit in the same manner as illustrated in FIGURE 7.

Figure 6:
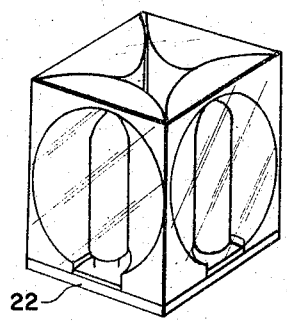
FIGURE 6 is a perspective view of a further modification wherein the unit is in the shape of a cube.
Figure 2:
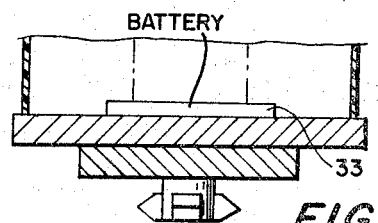
FIGURE 2 is a vertical sectional view taken along the line 2—2 of FIGURE 1.
Figure 3:
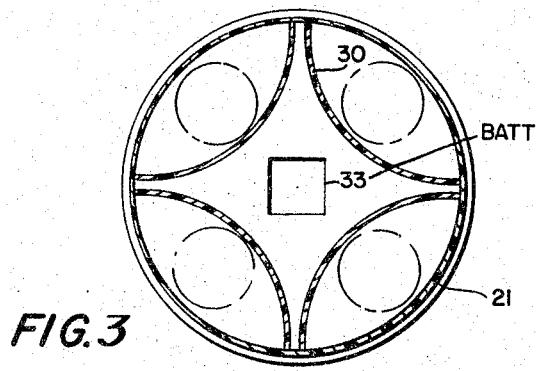
FIGURE 3 is a transverse sectional view taken along the line 3—3 of FIGURE 1.

In FIGURE 6 the unit is similar to that shown in FIGURE 1 but the envelope has the shape of a regular polygon which, for example, may be a square. The base 22 is shaped to conform to the cross section of the envelope and the remaining structure of this unit is similar to that described for the unit of FIGURE 1.

The battery as it is positioned in or on the base is an operative battery and to discharge the battery it is only necessary to close the circuit across the battery. Thus when the circuit is completed across the contacts of the flash bulb there is no delay in the ignition of the flash bulb as would be the case when the battery is inoperative and it is necessary to bring an electrolyte in contact with the electrode.

In the case of a large flash bulb as would be used for professional outdoor shots a number of such batteries as described above could be assembled in the flash bulb to provide increased voltage.

While one conventional form of flash bulb has been described above it is pointed out that this invention may be incorporated in other types of flash bulbs.

Thus it is apparent that the present invention has disclosed an improved flash bulb which has a self contained electrical battery therein so as to eliminate the need for an external source of electrical energy. The flash bulb can be ignited merely by closing a circuit across the contacts of the bulb. The battery is completely enclosed either by a plastic coating or by the material of the envelope of the flash bulb and has an indefinite shelf life. The flash unit of this invention thus may be modified so as to provide a successive plurality of photo flash illumination effects all ignited by a single source of electrochemical energy self contained within the unit. The result is an improved flash unit which can be depended upon to ignite and to give good results whenever required without the problem of first determining whether the external source of electrical energy will be able to ignite the flash bulb.

It will be understood that this invention is susceptible to modifications in order to adapt it to different usages and conditions and, accordingly, it is desired to comprehend such modifications within this invention as may fall within the scope of the appended claims.

What is claimed is:

1. A photo flash lamp unit comprising an envelope having a base portion and composed at least partially of a light transmitting material, a plurality of means within said envelope for radiating an actinic light when ignited electrically and burned, a corresponding plurality of pairs of electrical contacts on the outer surface of said base portion and connected to said light radiating means, and an electrochemical source of energy within said envelope capable of supplying a quantity of electrical energy for igniting said light radiating means and connected between said pairs of contacts so that closing a circuit across a pair of contacts will enable said electrochemical source to ignite the light radiating means connected thereto.

2. A photo flash lamp unit as claimed in claim 1 and further comprising a plurality of reflectors within said envelope and disposed in operative relationship with respect to each of said light radiating means.

3. A photo flash lamp unit as claimed in claim 1 wherein said light radiating means comprises a plurality of flash bulbs disposed along the inner surface of said envelope.

4. A photo flash lamp unit as claimed in claim 1 and further comprising a plurality of reflectors within said envelope disposed along the inner surface thereof, each of said light radiating means being operatively disposed with respect to a reflector and being positioned between the reflector and the envelope surface.

5. A photoflash lamp unit as claimed in claim 1 with said envelope being cylindrical and said base portion closing one end of said envelope, said light radiating means being spaced along the inner surface of said cylindrical envelope.

6. A photo flash lamp unit as claimed in claim 1 wherein said envelope has the shape of a regular polygon with said base portion closing one end of said polygon, said light radiating means being disposed along the inner faces of the sides of said polygon.

7. A photo flash lamp unit as claimed in claim 1 wherein said source of energy comprises a dry paste battery.

8. A photo flash lamp unit as claimed in claim 1 w said source of energy being mounted on said base port within said envelope.

9. A photo flash lamp unit as claimed in claim 1 w said source of energy being imbedded in said envelc base portion.

References Cited by the Examiner

UNITED STATES PATENTS

| | | | |
|---|---|---|---|
| 1,853,968 | 4/1932 | Fagan | 67— |
| 2,723,549 | 11/1955 | Martin | 67— |
| 2,983,811 | 5/1961 | O'Brian | 240—10. |
| 3,244,087 | 4/1966 | Anderson et al. | 240— |

JAMES W. WESTHAVER, *Primary Examiner.*